Sept. 23, 1969  M. P. KLITZSCH  3,468,762
DISTILLATION OF SEA WATER USING STEAM TURBINE ELECTRIC
GENERATOR AND SOLAR STILL
Filed June 9, 1965  2 Sheets-Sheet 1
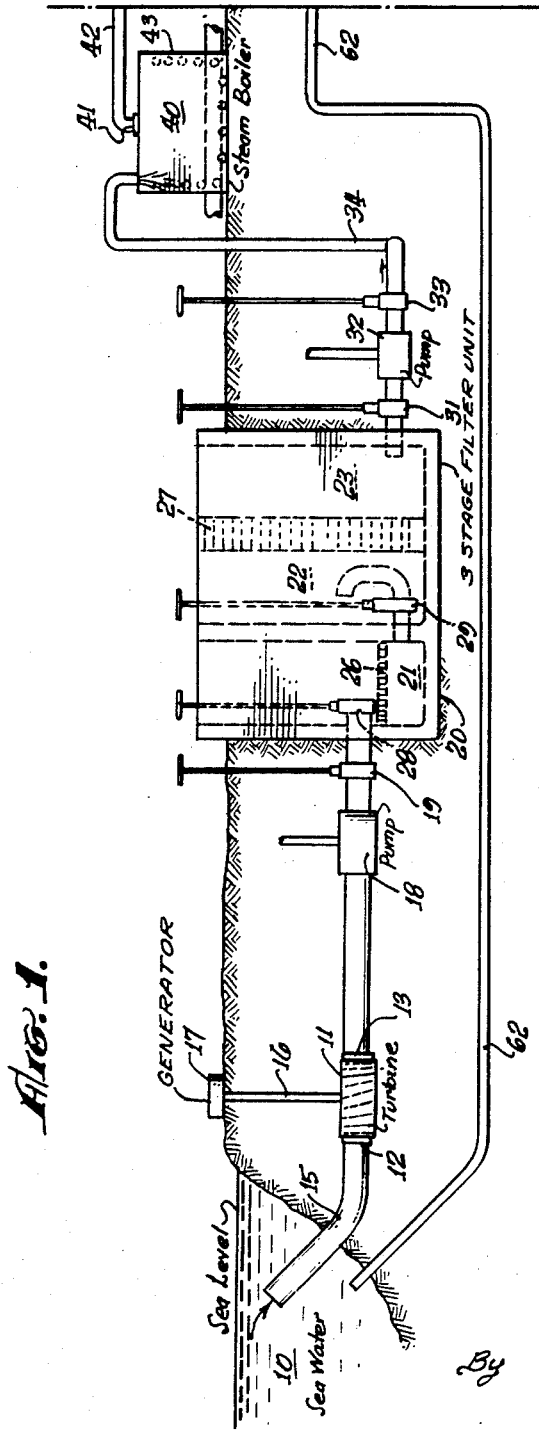
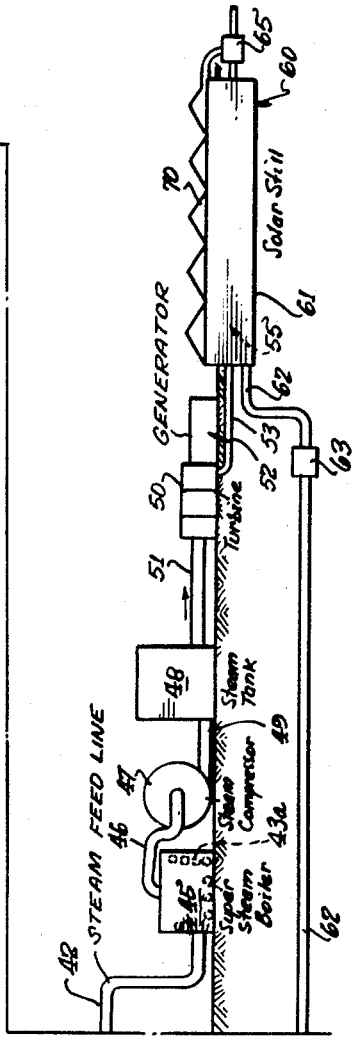
INVENTOR.
MAX P. KLITZSCH,
By Victor G. Laslo.
ATTORNEY.

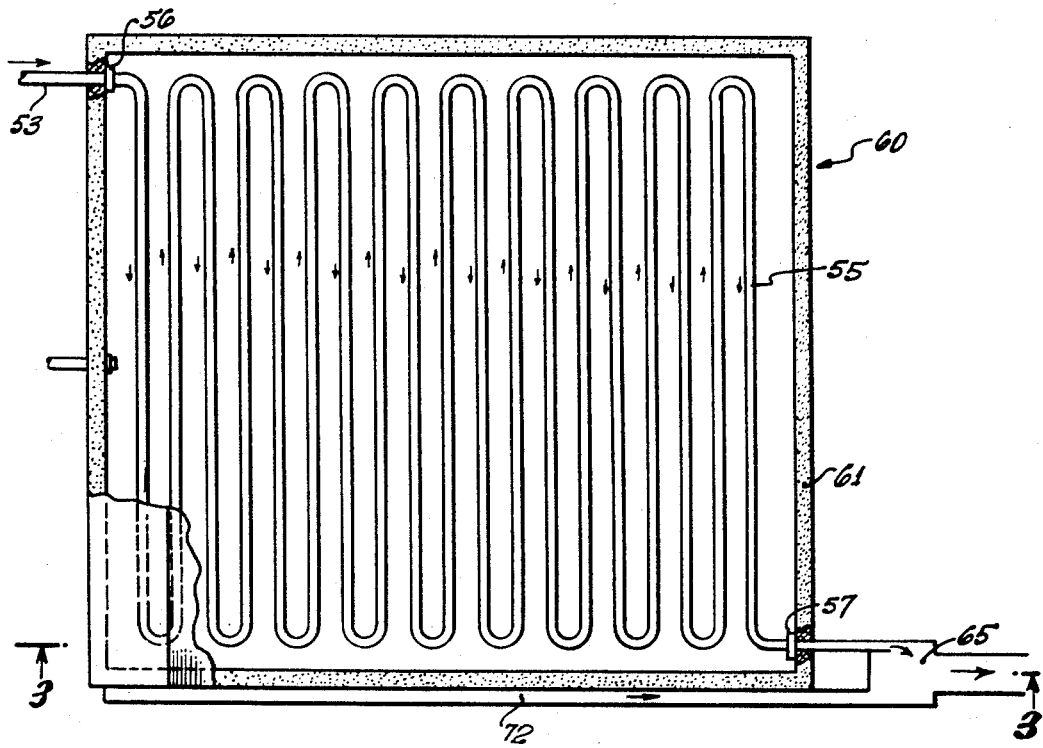
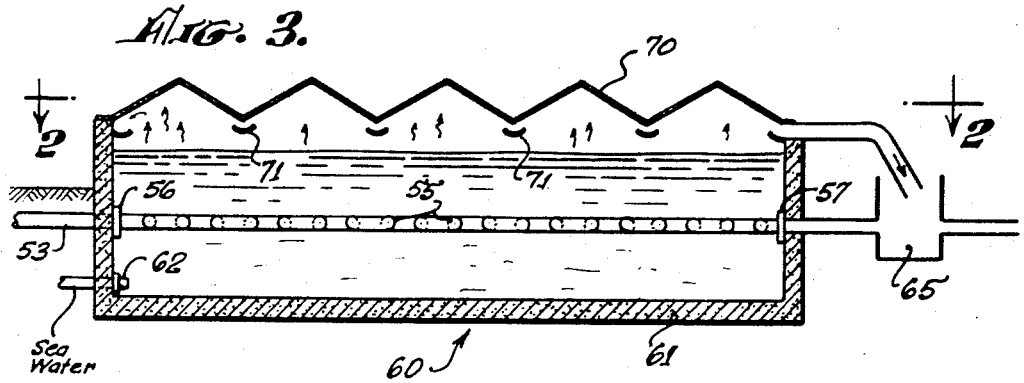

3,468,762
Patented Sept. 23, 1969

3,468,762
DISTILLATION OF SEA WATER USING STEAM TURBINE ELECTRIC GENERATOR AND SOLAR STILL
Max P. Klitzsch, 2453 Alder St., Pomona, Calif. 91767
Filed June 9, 1965, Ser. No. 462,628
Int. Cl. C02b *1/06;* F01k *27/00;* B01d *3/00*
U.S. Cl. 202—186                               3 Claims

ABSTRACT OF THE DISCLOSURE

An apparatus for the distillation of sea water comprising: a turbine means located below sea level and having an inlet into the ocean; electrical generator means being operatively coupled to the turbine, sea water discharged from the turbine passes through a filter unit and thence to a boiler for producing steam which drives a turbo-generator, the electric current generated is used to heat the boiler and steam from the turbo-generator is utilized to heat sea water in a solar still evaporator, the water vapor and steam produced being condensed and collected as condensate.

---

This invention relates to the desalination of water and more particularly to improved techniques for the distillation of sea water.

The ever increasing demand for potable water has directed much attention toward desalination techniques, whereby the oceans can be used as an unlimited source of supply. Typical desalination apparatus is based upon the use of the well-known distillation technique wherein pure water is separated from less volatile and heavier components by boiling, the water being recovered by cooling and condensing the vapor. Two principal methods have been used to vaporize the sea water, steam boilers and solar stills. The present invention is directed toward a desalination system utilizing both of these methods in a novel combination, whereby system efficiency and output are substantially improved.

Briefly, the present invention technique consists of evaporating a quantity of sea water to form steam, feeding another quantity of sea water to a solar still, and using the feedwater of the solar still to cool the steam, the heat given up by the steam during condensation in turn heating the feedwater to thereby increase the efficiency of the solar still. A further increase in system efficiency is achieved by disposing the turbine of a hydro-electric generator used to supply electrical energy to the system sufficiently below sea level so that the head pressure of the ocean water at the turbine fluid inlet will be sufficient to drive the turbine. Thus, the turbine drive system consists merely of a conduit running from the turbine fluid inlet to the ocean.

Accordingly, it is an object of the present invention to provide improved distillation methods and apparatus.

It is also an object of the present invention to provide improved desalination processes and apparatus.

It is another object of the present invention to provide a highly efficient desalination technique.

It is a further object of the present invention to provide a desalination apparatus utilizing a novel combination of steam boiler and solar still means.

It is yet another object of the present invention to provide an improved solar still apparatus.

It is a still further object of the present invention to provide a desalination apparatus wherein the water pressure of an ocean is utilized to drive the turbine of a hydro-electric generator used to supply electrical energy to the apparatus.

It is also an object of the present invention to provide a desalination system wherein a turbine used in the system is driven by the static pressure of an ocean.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a semi-schematic elevation view of apparatus for performance of the present invention techniques;

FIGURE 2 is a sectional view of the present invention solar still, taken along the line 2—2 of FIGURE 3; and FIGURE 3 is a view taken along the line 3—3 of FIGURE 2.

Turning now to the drawing, in FIGURE 1 there is shown a semi-schematic diagram of a presently preferred embodiment of apparatus suitable for performance of the present invention techniques. The present invention desalination system is depicted as being located in the proximity of an ocean 10 which is the source of sea water to be purified. A turbine 11 is disposed deep underground so that it is a minimum predetermined distance below sea level. The turbine 11 is provided with a fluid inlet 12 and a fluid outlet 13. An intake pipe 15 is utilized to place the turbine inlet in communication with the ocean, one end of the pipe opening into the sea and the other end of the pipe being connected to the turbine fluid inlet 12. Operatively coupled to the turbine 11 by means of a drive shaft 16 is an electric generator 17, the electric generator 17 being located at ground level.

The turbine 12 is disposed a sufficient distance below sea level so that the head pressure of the ocean urges the sea water against the turbine blades with sufficient force to drive the turbine. Those skilled in the art can readily determine the depth below sea level at which the turbine must be placed in order to provide the necessary impeller force for a given installation. For example, the pressure at about 40 feet below sea level is sufficient for a typical turbine driving a low speed electric generator to provide about 7,000 kilowatts of electric power, with a salt water feed rate on the order of 700 gallons per minute.

After passing through the turbine 12 the sea water leaves the turbine through the fluid outlet 13 and is passed to steam generating means. In the illustrated embodiment a pump 18 is shown for transferring the sea water from the turbine 12 to the steam generating means. It is to be understood that in some certain installations, depending upon the terrain, for example, such a feed pump might be unnecessary. From the feed pump 18 the water passes through a motorized valve 19 into a filter unit generally indicated by the reference numeral 20.

The illustrated filter unit 20 is of the 3-stage variety and includes a first filter section 21, a second filter section 22 and a third filter section 23. The first filter section 21 is provided with a horizontally disposed screen 26 to remove rough material. The second filter section is of the so-called Akdulit type and is separated from the third filter section by a porous vertical partition 27. Thus, upon passing through the porous partition filtered water enters the third section. The first and second sections are provided with motorized or hand operated valves 28 and 29 to allow for cleaning and maintenance.

Upon leaving the third section of the filter unit, the water passes through a motorized valve 31, a pump 32 and another motorized valve 33. In the illustrated embodiment the pump 32 serves to pump the filtered water through a pipe 34 to a steam boiler 40 disposed at an appropriate level. In installations wherein the steam boiler inlet is at the same level as the filter outlet the pump 32 may be unnecessary. The steam boiler 40 is of the type wherein water is heated and vaporized by spraying it onto electric heater elements 43 which are energized by electricity obtained from generator 52. The boiler 40 is provided with a steam outlet 41 to which is coupled a steam feed pipe 42 which is connected to the inlet of a super steam boiler 45. The steam is super-heated in the boiler 45, which also utilizes a plurality of electric heating elements 43a disposed in a suitable pattern throughout the boiler which are energized by electricity obtained from generator 52. The superheated steam is taken from the boiler 45 and passed through a feed pipe 46 to a steam compressor 47.

The compressed team leaves the compressor 47 and is conducted to a pressure equalizing storage tank 48 by means of a feed pipe 49. The compressed steam is conducted from the storage tank 48 by means of a feed pipe 51 to the fluid inlet of a turbine 50, which is used to drive a main electric generator 52. Therefore, the turbine 50 and the electric generator 52 provide a main turbo-electric generator, the turbo-electric generator formed by the turbine 11 and the electric generator 17 being used for start-up purposes in this embodiment. In other embodiments this turbo-electric generator can be the sole source of electric power for the desalination apparatus.

Upon leaving the turbine 50 the steam passes through a steam pipe 53 to a tubular heat exchanger 55 disposed within a solar still 60, as can best be seen in FIGURES 2 and 3 of the drawing.

The solar still 60 comprises a tank 61 preferably constructed of a durable waterproof, heat insulating material, such as concrete, for example. The tank 61 is filled to a suitable level with sea water drawn from the ocean through a feedline 62, the feedline including a pump 63, if necessary. The tubular heat exchanger 55 is disposed beneath the feedwater level in the tank, as shown in FIGURE 3 of the drawing. Thus, the sea water is utilized as the coolant fluid for the heat exchanger. Although in the illustrated embodiment the heat exchanger is shown to be positioned some distance above the bottom of the tank 61, the actual positioning is not critical and the heat exchanger coil can be partially embedded in the tank bottom, if desired.

The tubing of the heat exchanger 55 defines a sinuous path beginning at an inlet 55 and ending at an outlet 56. It is presently preferred to utilize tubing of a gradually reducing diameter so that the maximum diameter end is at the inlet 55 and the minimum diameter end is at the outlet 56. This gradual reduction in the tube diameter will effectively control the distance which the steam travels through the heat exchanger before condensing. The outlet 56 of the heat exchanger empties into a reservoir 65 which collects the purified condensate.

A transparent cover 70, of irregular configuration is fitted to the open top of the tank 61, the cover being preferably fabricated of elongate rectangular sheets of glass or plastic disposed in the angular relationship shown in FIGURE 3. A plurality of condensate troughs 71 are provided with a trough being disposed beneath each of the lowermost edges of the glass sheets. The condensate troughs 71 empty into a feed trough 72 (see FIGURE 2) which also empties into the reservoir 65. Such solar still configurations are well known to those skilled in the art and hence will not be explained in further detail, it being understood that various other types of solar still configurations will be suitable for use with the present invention.

The solar still 60 has a dual function. During the sunlight hours, the rays of the sun hitting the air-tight cover 70 will heat the feedwater in the tank 61 sufficiently to cause evaporation. Water will condense on the underside of the glass cover 70, the water then dripping off into the condensate troughs 71 and then flowing through the feed troughs 72 into the reservoir 75. Thus, the solar still functions in the usual manner of distillation by evaporation and condensation of feedwater. However, its operation in the usual manner is rendered more efficient by heating the feedwater from another source, namely the heat exchanger 55 into which steam is fed. Heat is given up by the steam to the feedwater in the tank 61, thereby rendering the solar still more efficient. However, the feedwater in the solar still also functions to cause condensation of the steam within the heat exchanger 55, thereby completing the distillation of the sea water fed to the steam generating means.

Under certain conditions, heating of the solar still feedwater 61 by means of the heat exchanger 55 can be sufficient to cause significant evaporation of the feedwater of the still, thereby rendering the still useful, though at reduced efficiency, even in the absence of sunlight.

To operate the present invention system the electric heating elements in the steam boiler 40 and the super heat boiler 45 are connected to the output of the electric generator 17 through suitable electrical circuitry, not shown and water is allowed to flow through the intake pipe 15 to operate the turbine 12. Thus, electric energy for start-up purposes is provided by the electric generator 17, this electric generator providing the entire system requirements, such as for water heating, driving pumps, etc. The water is filtered through the filter unit 20 and heated in the steam boiler 40, the resulting steam being superheated and compressed and fed to the turbine 50. When steam is brought up in the system the turbine 50 will begin to operate, thereby actuating generator 52 to provide additional electric power for the apparatus or for external distribution. The distillation process is completed by condensation of the steam within the heat exchanger disposed in the solar still. At the same time sea water is being pumped directly to the tank 61 of the solar still through the feedline 62 and distilled by evaporation in the solar still. The fresh water output of both of these distillation systems are fed through the reservoir 65. If the fresh water collected in the reservoir 65 is to be used for human consumption, necessary minerals can be added at that point.

Thus there has been described a novel distillation technique wherein elements of two distillation systems are combined in a solar still for increased efficiency and output. Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed. For example, various of the system components, such as filters, boilers, etc., can be duplicated by tandem connection for either alternative or simultaneous operation to thereby facilitate maintenance and cleaning or provide increased system output:

What is claimed is:

1. Apparatus for the distillation of sea water comprising turbine means disposed underground and having a fluid inlet and a fluid outlet for passing sea water through the turbine; electrical generator means operatively coupled to said turbine means; conduit means having an inlet in communication with an ocean body of water and an outlet in communication with the fluid inlet of said turbine means, said turbine means being disposed below sea level a sufficient distance so that the sea water pressure at the inlet of said turbine means is sufficient to operate said turbine means; a multi-stage filter unit having means defining a water inlet in communication with the fluid outlet of said turbine means, a steam boiler connected to receive filtered sea water from said filter unit for producing steam, said sea water being heated by direct contact with electric heater elements arranged in the boiler and being electrically connected to said electrical generator means for energization thereby; solar distillation apparatus defining a receptacle for receiving feedwater conducted thereto from said ocean and further defining a condensate outlet; and vapor condensing means, said vapor condensing means comprising a tubular heat exchanger means submerged within the feedwater in said receptacle, a turboelectric generator operatively connected to a compressed superheated steam source, said vapor condensing means further defining a vapor inlet coupling one end of said tubular heat exchanger means to the steam discharge outlet of said turbo-electric generator and a condensate outlet coupling the other end of said tubular heat exchanger means to the condensate outlet of said solar distillation apparatus.

2. Apparaus for the distillation of sea water comprising: turbine means having a fluid inlet and a fluid outlet; electrical generator means operatively coupled to said turbine means; conduit means having an inlet in communication with an ocean body of water and an outlet in communication with the fluid inlet of said turbine means, said turbine means being disposed below sea level a sufficient distance so that the sea water pressure at the inlet of said turbine means is sufficient to operate said turbine means; steam generating means having a water inlet in communication with the fluid outlet of said turbine means and having a vapor outlet, said steam generating means including electrically energizable heating elements connected to said electrical generator means for energization thereby; solar distillation apparatus defining a receptacle for feedwater obtained from said ocean body of water and further defining a condensate outlet; and vapor condensing means, said vapor condensing means defining tubular heat exchanger means submerged within the feedwater in said receptacle, said vapor condensing means further defining a vapor inlet coupling one end of said tubular heat exchanger means to the vapor outlet of said steam generating means and a condensate outlet coupling the other end of said tubular heat exchanger means to the condensate outlet of said solar distillation apparatus.

3. Apparatus for the distillation of sea water comprising: turbine means having a fluid inlet and a fluid outlet; electrical generator means operatively coupled to said turbine means; conduit means having an inlet in communication with an ocean body of water and an outlet in communication with the fluid inlet of said turbine means, said turbine means being disposed below sea level a sufficient distance so that the sea water pressure at the inlet of said turbine means is sufficient to operate said turbine means; filter means having a fluid inlet in communication with the fluid outlet of said turbine means and a fluid outlet; a steam boiler having a fluid inlet in communication with the fluid outlet of said filter means and a vapor outlet; solar distillation apparatus defining a receptacle for feedwater obtained from said ocean and further defining a condensate outlet; vapor condensing means disposed within the receptacle of said solar distillation apparatus, said vapor condensing means including tubular heat exchanger means submerged within the feedwater of said receptacle, said tubular heat exchanger means defining a steam inlet and a condensate outlet, the condensate outlet of said heat exchanger means being coupled to the condensate outlet of said solar distillation apparatus and to means for collecting the condensate; and steam compressor means coupled between the vapor outlet of said steam boiler and the steam inlet of said heat exchanger means.

References Cited

UNITED STATES PATENTS

| | | | |
|---|---|---|---|
| 3,232,846 | 2/1966 | Kimmerle | 202—185 |
| 3,243,359 | 3/1966 | Schmidt | 202—174 |
| 236,940 | 1/1881 | Faesch | 202—185.2 X |
| 2,233,321 | 2/1941 | Meurk et al. | 202—180 X |
| 2,280,093 | 4/1942 | Kleinschmidt | 203—10 |
| 2,372,846 | 4/1945 | Nettel et al. | 202—152 |
| 2,902,028 | 9/1959 | Manly | 202—234 |
| 2,515,013 | 7/1950 | Kruhmin | 202—180 |
| 2,979,442 | 4/1961 | Badger | 203—10 |
| 3,076,096 | 1/1963 | Bachmann | 203—10 |
| 3,140,986 | 7/1964 | Hubbard | 202—234 |
| 3,224,948 | 12/1965 | Akers | 202—180 |

NORMAN YUDKOFF, Primary Examiner

F. E. DRUMMOND, Assistant Examiner

U.S. Cl. X.R.

60—26, 64; 202—234; 203—10